A. A. MATTERN.
Improvement in Animal-Traps.
No. 128,233.          Patented June 25, 1872.
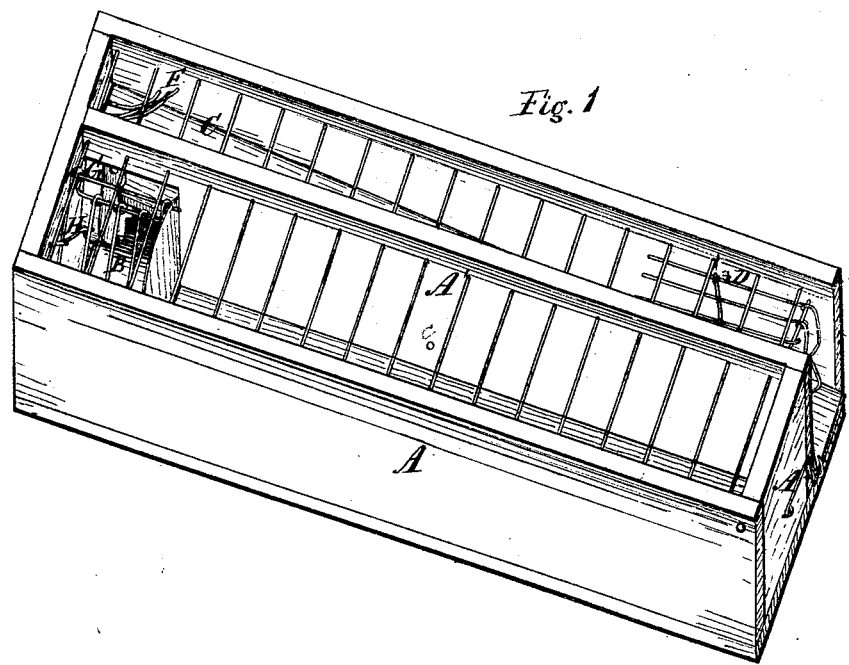
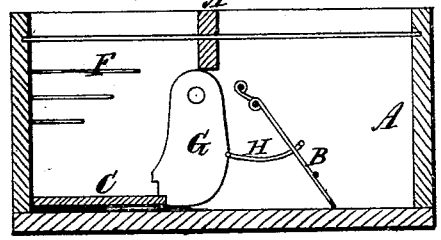
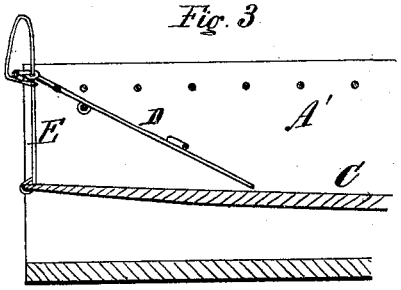

128,233

UNITED STATES PATENT OFFICE.

ALBERT A. MATTERN, OF MORRISON, ILLINOIS, ASSIGNOR TO HIMSELF, CASSIUS C. CLENDENIN, AND WALTER DUFFIN, OF SAME PLACE.

IMPROVEMENT IN ANIMAL-TRAPS.

Specification forming part of Letters Patent No. 128,233, dated June 25, 1872.

Specification describing a certain Improvement in Animal-Traps, invented by ALBERT A. MATTERN, residing at Morrison, in the county of Whitesides and State of Illinois.

This invention relates to that class of animal-traps which are constructed with two compartments communicating by means of a door, the compartment which is first entered by the animal containing a treadle which automatically closes the entrance-opening as the animal approaches the bait, inducing it to pass through the door to the second compartment in order to find an exit. The door, being connected to the catch holding the treadle, operates the catch as it is opened, and resets the trap for catching another animal. My improvement consists in the combination, with the treadle, of a swinging door automatically operated by the treadle to open and close the entrance-opening, a catch which engages with the inner end of the treadle as it is depressed by an animal, and the door in the partition between the two compartments, which is connected with the catch and operates it to release the treadle, which, being pivoted so that its outer end is the heavier, immediately oscillates so as to depress its outer end and opens the entrance-door, resetting the trap.

Figure 1 is a perspective view of my improved animal-trap. Fig. 2 is a transverse vertical section thereof. Fig. 3 is a vertical longitudinal section.

The same letters of reference are used in all the figures in the designation of identical parts.

The box A is divided into two compartments longitudinally by the partition A', which is provided with an opening at one end, covered by a door, B, of wire grating, swinging upon a horizontal hinge in the manner indicated in Figs. 1 and 2. One of the compartments contains a treadle, C, which oscillates upon the axis c, so arranged that the end of the treadle, extending toward the open end of the compartment, shall be the heavier, and thus be depressed by its own weight to the bottom of the box to permit an animal to enter the compartment through its open end at a. A door, D, of wire grating, is hung in the upper part of this end of the compartment upon horizontal hinges or a spindle, and connected with the treadle by the rod E, which oscillates the door in such a manner as to throw it up when the treadle assumes the position shown in Fig 1, leaving the entrance a wide open; but to throw it down when the treadle assumes the position indicated in Fig. 3, precluding the escape of the animal at this point. The bait is placed in a basket, F, at the other or closed end of this compartment, and as the animal travels up the incline treadle toward the bait its weight will oscillate the treadle, thereby closing the entrance-opening j and causing the swinging catch G to engage the treadle in the manner shown in Fig. 2. This catch will hold the treadle depressed at this end and the door D in the position shown in Fig. 2, so that the animal cannot leave the trap there. Its only alternative is to pass through the door B into the other compartment, in doing which the door is lifted and operates the catch through the medium of the hook H attached to the catch and hooked to the door B in manner to release the treadle, which immediately assumes its normal position, that shown in Fig. 1, resetting the trap. The animal having once entered the second compartment, is securely entrapped.

The top of the box consists of an open grating of requisite fineness, and the second compartment is provided with a door, $A^2$, at one end to empty the trap.

I am aware that the combination of the treadle, inclined door in the partition, and the gravitating-catch, and connecting-rod is old, as is likewise the combination of the treadle, hook, and entrance-door. I do not, therefore, claim either of these combinations separately considered. My invention consists in providing a trap containing all the elements of the two above-mentioned combinations in a single combination, the parts of which are coefficients of one another.

What I claim as my invention, and desire to secure by Letters Patent, is—

The combination of the gravitating-treadle C, door D, rod E, catch G, hook H, and door B, substantially as and for the purpose specified.

In testimony whereof I have signed my name to this specification in the presence of two subscribing witnesses.

ALBERT A. MATTERN.

Witnesses:
C. E. WILKINSON,
FRANK CLENDENIN.